INVENTORS
STANLEY P. GREENFIELD
GARY L. FALKENSTEIN
EUGENE R. REINHART
RICHARD H. DOUGHERTY
BY
ATTORNEYS

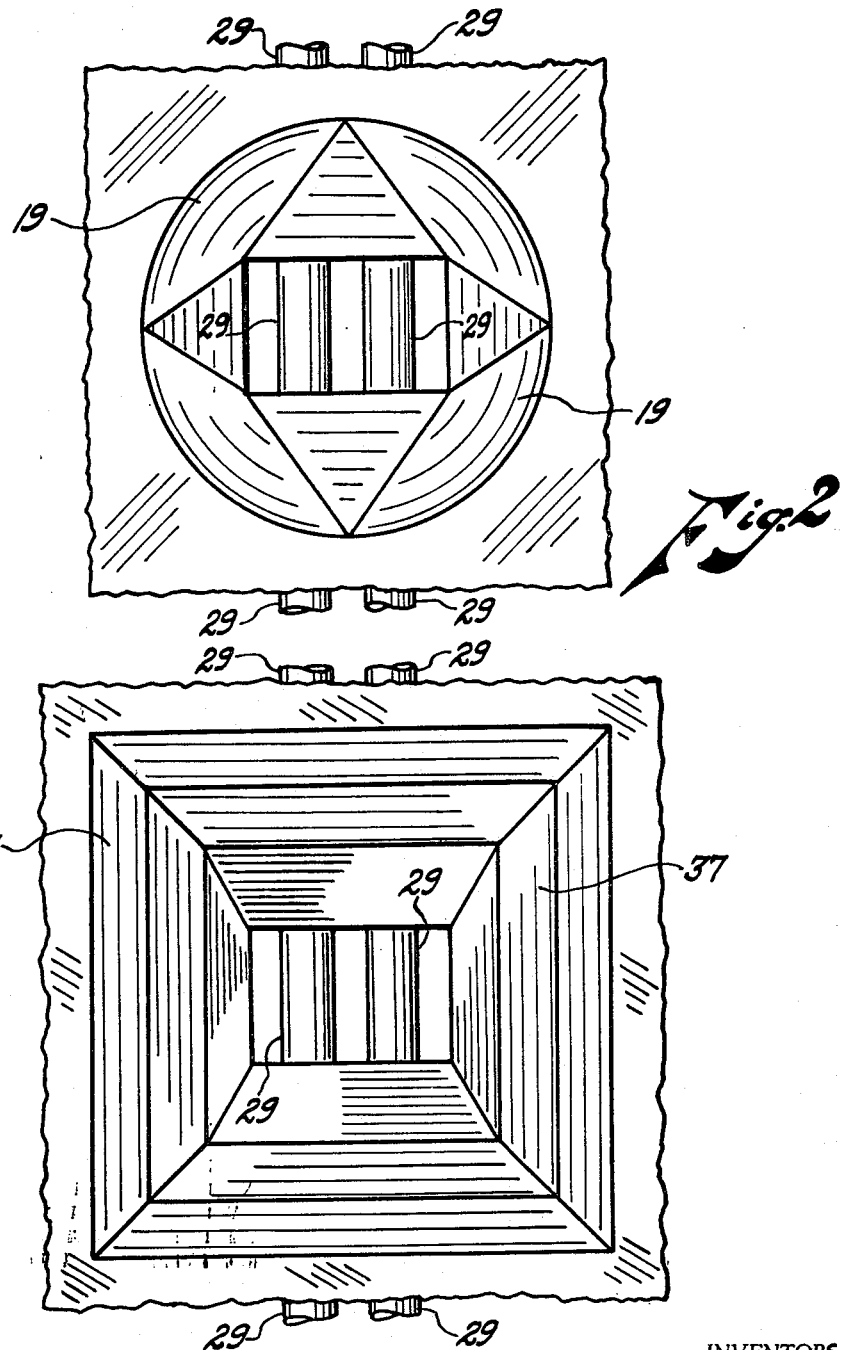

United States Patent Office 3,505,853
Patented Apr. 14, 1970

3,505,853
ROCKET THRUST CHAMBER FOR EVALUATING REFRACTORY METALS
Stanley Greenfield, Woodland Hills, Gary L. Falkenstein Los Angeles, Eugene R. Reinhart, Canoga Park, and Richard H. Dougherty, Tarzana, Calif., assignors to the United States of America as represented by the Secretary of the Air Force
Filed Jan. 25, 1968, Ser. No. 700,587
Int. Cl. G01n *17/00, 25/00*
U.S. Cl. 73—15.4   2 Claims

ABSTRACT OF THE DISCLOSURE

A rocket thrust chamber having a specially constructed nozzle attached at the downstream end which includes a water-cooled contraction section that transitions from circular to rectangular. A pair of tubular test specimens are positioned perpendicular to the flow of combustion gases across the throat section which is of rectangular configuration immediately downstream from the contraction section. The nozzle section includes a rectangular divergent exit nozzle downstream from the throat section. Coolant is circulated through the specimen as well as through the combustion chamber and nozzle and the specimens are further cooled by the transpiration of helium at the location where they join the wall of the throat section.

BACKGROUND OF THE INVENTION

This invention relates to a specially constructed nozzle for testing metals and alloys used in the construction of rocket thrust chambers and, more particularly, the invention is concerned with providing a thrust chamber nozzle assembly capable of holding a sample of refractory material to be tested and subjecting the sample to combustion gases in an environment comparable to that encountered in a rocket engine under operating conditions.

Many tests have been devised for obtaining physical and chemical properties of refractory metals. These tests provide data in various tables and graphs showing the different properties of the materials at elevated temperatures. However, the presently known tests are insufficient for a final evaluation of the merits of the different materials for the various potential uses, especially for rocket engine thrust chambers. Questions regarding the relative merits and promises of the various refractory materials are difficult to answer. For example, the superiority of hard metals over ceramics and super-alloys for certain applications cannot presently be accurately determined. On paper, refractory metals and their alloys are superior to super-alloys as far as stress-rupture strength is concerned at elevated temperatures.

The relative superiority of the various refractory materials becomes more confusing when the tests are made at different elevated temperatures. The chemical stability and oxidation resistance become especially significant factors to consider in comparing the properties of the various materials at the higher temperatures. Other important considerations in choosing the refractory metals and alloys which would be best suited for application in the fabrication of regenerative cooled thrust chambers include strength-weight ratio, long-time strength, short-time strength, creep, and exposure to combustion gases.

SUMMARY OF THE INVENTION

The present invention provides an appropriate and relatively inexpensive means for realistically screening and evaluating the performance of these materials when exposed to the combustion gases of a typical rocket engine. There is disclosed a thrust chamber with an outlet nozzle having a throat section in which tubular test specimens can be inserted and subjected to the various stresses and conditions encountered in the combustion chamber of a rocket engine. This provides the information necessary to evaluate the material under actual operating conditions and thereby determine the physical properties best suited for fabrication of a rocket engine thrust chamber.

Accordingly, it is an object of the present invention to provide testing apparatus suitable to determine the physical and chemical properties of refractory materials under typical operating conditions.

Another object of the invention is to provide apparatus wherein a relatively small sample of material can be tested and evaluated in environmental conditions comparable to those encountered when the material is used in practice.

Still another object of the invention is to provide an improved testing apparatus for high-temperature performance evaluation of a hollow water-cooled specimen of refractory material.

A further object of the invention is to provide a testing apparatus capable of applying a known stress to the test specimen prior to testing under simulated rocket conditions.

A still further object of the invention is to provide a testing apparatus including a rocket combustion chamber wherein the specimen to be tested is cooled with one of the rocket propellants.

Another still further object of the invention is to provide testing apparatus in the form of a rocket thrust chamber in which refractory material to be tested is placed across the throat of a special nozzle section perpendicular to the gas flow thereby subjecting the specimen to a very high heat rejection rate.

These and other objects, features and advantages will become more apparent after considering the description that follows and from the drawings wherein like numbers are used throughout to identify like elements.

DESCRIPTION OF THE DRAWINGS

In the drawings:

FIGURE 2 is a view looking downstream into the throat section of the nozzle showing a pair of test specimens in position; and FIGURE 3 is a view looking upstream toward the throat section of the nozzle showing the rectangular exit configuration.

DESCRIPTION OF THE PREFERRED EMBODIMENT

Figure 1:
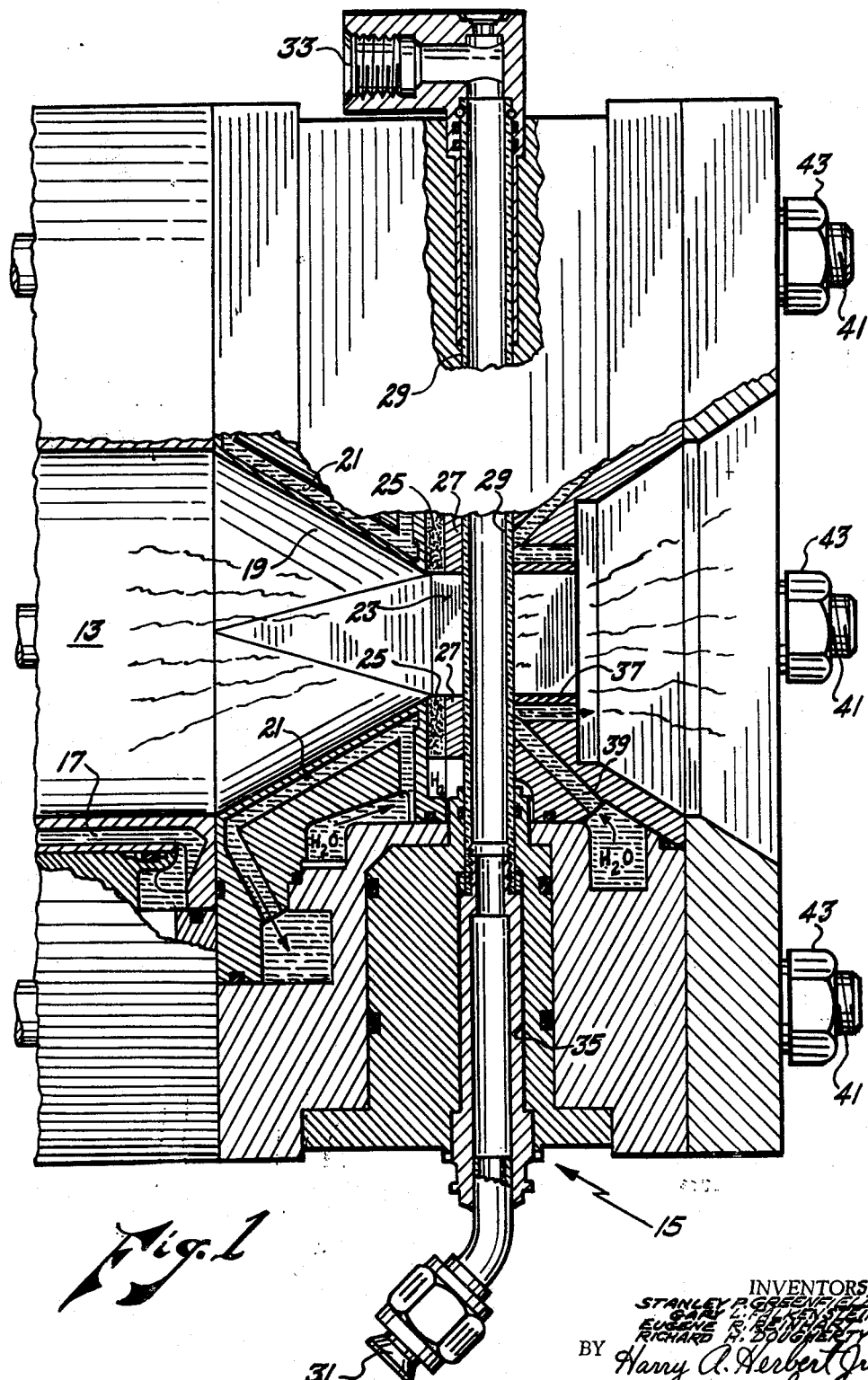
FIGURE 1 is a view in partial cross-section of the nozzle area of a rocket thrust chamber showing the test specimen positioned across the throat section.

Referring now to the drawings, the rocket thrust chamber for evaluating refractory metals according to the invention includes a water-cooled combustion chamber 13 capable of operation in the range of 1000 to 1500 p.s.i.a. chamber pressure. An outlet nozzle 15 is positioned at the downstream end of the combustion chamber 13. A series of channels 17 surround the inner wall of the chamber 13 and serve to maintain the temperature at an acceptable level by circulating coolant therethrough which absorbs heat and flows away from the critical area.

The outlet nozzle 15 includes a water-cooled contraction section 19 located immediately adjacent to the downstream end of the combustion chamber 13. The combustion gases from the cylindrical combustion chamber 13 pass through the water-cooled convergent section 19 which is cooled by circulating fluid through the passageways 21. The nozzle convergent section 19 transitions from circular to rectangular cross-section as shown in FIGURES 1 and 2. After passing through the contraction or convergent section 19, the combustion gases enter the throat section 23. Cooling in the throat section 23 is accomplished by the transpiration injection of helium through the porous insert 25. A copper insert 27 is positioned in immediate adjacent contact with the porous insert 25 and provides film cooling in the throat area.

A pair of refractory metal test specimens 29 in the form of tubes are placed across the throat section 23 of the specially constructed outlet nozzle 15. At this location, perpendicular to the flow of gases through the throat section 23, very high measured heat rejection rates can be obtained. The specimen tubes 29 are water-cooled by circulating fluid into the tube inlet 31 upwardly through the specimen 29 and out the tube outlet 33. To further simulate actual rocket conditions one of the propellants can be utilized as the circulating coolant fluid in place of water.

A micrometer means 35 is provided for placing a pre-run strain on the specimen tubes 29. This produces a stress in the tubes during the run which can be calculated from the heat rejection across the tube wall and the coefficient of expansion of the material. The film-cooled copper insert 27 is positioned in contact with the outer wall of the specimen tube 29 where it passes through the wall of the throat section 23 of the nozzle 15. This arrangement serves to prevent the portions of the specimen 29 which are not exposed to the combustion gases from being affected by the heat therefrom. The means for evaluating the performance of the refractory metals include a failure analysis of the specimen tubes 29 which cannot withstand the thermal or mechanical stresses during a test firing as well as metallographic analyses.

After the combustion gases travel downstream past the tube specimens 29 in the throat section 23, they enter the divergent exit section 37 of the nozzle 15. The configuration of the exit section 37 shown most clearly in FIGURE 3 is rectangular and relatively short. A series of channels 39 are contained under the surface of the rectangular exit section 37 for passing a coolant therethrough to prevent deterioration of the nozzle exit 37 caused by the heat from the hot combustion gases. The various sections of the nozzle 15 and the combustion chamber 13 are held in assembled position by a plurality of long bolts 41 which pass through the corresponding parts of the device and are tightened in position by the nut members 43.

MODE OF OPERATION OF THE INVENTION

A typical utilization of the herein described special nozzle for evaluating refractory metal alloys is to determine their applicability to the high-temperature, oxidizing environment of a rocket engine. For example, these tests provide results which can be used to evaluate the refractory metals at chamber pressure of 1200 p.s.i.a. with the propellants nitrogen tetroxide as the oxidizer and 50 precent hydrazine-50 percent unsymmetrical dimethyl hydrazine (UDMH) as the fuel. The test specimens can be subjected to the rocket engine interior environment for durations up to forty seconds. The above-described apparatus and procedure serves to screen and evaluate promising refractory metals and coatings for application to rocket engines.

Although the invention has been illustrated in the accompanying drawings and described in the foregoing specification in terms of a preferred embodiment thereof, the invention is not limited to this embodiment or to the particular uses mentioned. It will be apparent to those skilled in the art that our invention can be practiced utilizing the disclosed rocket thrust chamber with any suitable oxidizer-fuel system to produce the desired environmental conditions, particularly for the purpose of subjecting the test specimens to varying degrees of temperature and pressure. The disclosed system is especially useful as a tool for experimental investigations of different refractory materials at elevated temperatures to determine the one or ones best suited for use in the fabrication of a rocket engine combustion chamber.

It should be understood that various changes, alterations, modifications, and substitutions particularly with respect to the construction details can be made in the arrangement of the several elements without departing from the true spirit and scope of the appended claims.

Having thus described our invention, what we claim and desire to secure by Letters Patent of the United States is:

1. An apparatus for determining the physical and chemical properties of a refractory material at elevated temperature in an oxidizing environment comprising a rocket engine combustion chamber, an outlet nozzle through which combustion gases flow affixed to the downstream end of said chamber, said nozzle having a convergent section and a divergent section, a narrow throat section located between the convergent and divergent sections, a tubular specimen of refractory material positioned across said throat section perpendicular to the flow of combustion gases, micrometer means attached to one end of said tubular specimen, the other end of said specimen being affixed to the wall of said throat section, the adjustment of said micrometer means operating to place a pre-run strain on said specimen, said specimen being subjected to environmental conditions comparable in temperature and pressure to an operating rocket engine as the combustion gases pass through said throat section thereby accurately indicating the limits of usefulness of the refractory material under actual operating conditions.

2. The apparatus defined in claim 1 wherein transpiration cooling means are provided for maintaining the throat section of the outlet nozzle at a lower temperature, said transpiration cooling means including a porous insert in the wall of said throat section, helium being directed through said porous insert, and a copper insert in immediate adjacent contact with said porous insert and with said tubular specimen, said porous and copper inserts cooling the throat section by absorbing a portion of the heat therein.

References Cited

UNITED STATES PATENTS

| | | | |
|---|---|---|---|
| 3,005,338 | 10/1961 | Libby et al. | 73—147 |
| 3,165,924 | 1/1965 | Wolff | 73—86 XR |
| 3,176,499 | 4/1965 | Sikorg | 73—15.6 |

RICHARD C. QUEISSER, Primary Examiner

J. K. LUNSFORD, Assistant Examiner

U.S. Cl. X.R.

73—86, 147